United States Patent [19]

Vicard

[11] Patent Number: 5,708,715
[45] Date of Patent: Jan. 13, 1998

[54] INTEGRATED CIRCUIT DEVICE WITH FUNCTION USAGE CONTROL

[75] Inventor: Dominique Vicard, Crolles, France

[73] Assignee: Hewlett-Packard Company, Palo Alto, Calif.

[21] Appl. No.: 643,066

[22] Filed: Apr. 30, 1996

[30] Foreign Application Priority Data

May 18, 1995 [EP] European Pat. Off. ............ 95410047.5

[51] Int. Cl.$^6$ ...................................................... H04K 1/00
[52] U.S. Cl. .................................................. 380/25; 380/4
[58] Field of Search ........................... 380/3, 4, 23, 24, 380/25, 21

[56] References Cited

U.S. PATENT DOCUMENTS

| | | |
|---|---|---|
| 5,231,668 | 7/1993 | Kravitz . |
| 5,293,610 | 3/1994 | Schwarz ........................ 380/3 |
| 5,377,264 | 12/1994 | Lee et al. ...................... 380/4 |
| 5,379,344 | 1/1995 | Larsson et al. ................ 380/23 |
| 5,428,685 | 6/1995 | Kadooka et al. .............. 380/25 |
| 5,432,950 | 7/1995 | Sibigtroth ..................... 380/3 |
| 5,467,396 | 11/1995 | Schossow et al. ............. 380/4 |
| 5,495,531 | 2/1996 | Smiedt .......................... 380/4 |
| 5,530,749 | 6/1996 | Easter et al. .................. 380/3 |
| 5,619,573 | 4/1997 | Brinkmeyer et al. ......... 380/23 |

FOREIGN PATENT DOCUMENTS

566512A1  4/1993  European Pat. Off. .
635790A1  6/1993  European Pat. Off. .
2250617  11/1991  United Kingdom .

OTHER PUBLICATIONS

Electronics Week, vol. 58, No. 7, Feb. 1985, J. S. Kontur et al., "Locking Up System Security".
Mini–Micro Conference Record, 11 Nov. 1983, B. Huston, "New ICs Help Prevent Software Theft".
European Search Report, EP 95 41 0047, 7 Nov. 1995.

*Primary Examiner*—David C. Cain

[57] ABSTRACT

An integrated circuit device (chip) has lock circuitry that controls operational enablement of a functional block of the chip. To unlock the lock circuitry, a "chip-key" must be supplied to the chip over a secure communications link, the chip-key being communicated in encrypted form and then decrypted in a secure communication block of the chip. To prevent internal examination of the chip revealing the chip key, the latter is not stored as such in the chip. Instead, only a signature of the chip-key is stored, the latter being formed from the chip-key by subjecting the latter to a one-way function. The chip-key input to the lock circuitry is subjected to the same one-way function in block before being compared with the stored chip-key in comparator; if a match is found, a gating circuit is enabled to pass a necessary signal (such as a clock signal) to the functional block. By way of example, the secure communication block may implement the Diffie-Hellman Key Exchange algorithm whilst the one-way function block may implement a one-way hash function such as effected by the Secure Hash Algorithm.

12 Claims, 3 Drawing Sheets

INTEGRATED CIRCUIT DEVICE WITH FUNCTION USAGE CONTROL

FIELD OF THE INVENTION

The present invention relates to integrated circuit devices with function usage control.

BACKGROUND OF THE INVENTION

In the field of computer security, two strands can be distinguished, namely data access control and function usage control. These strands overlap and intertwine with each other—thus, data access control frequently relies on restricting usage of accessing equipment (function usage control) whilst function usage control is often critically based on the secure storage of passwords (data access control).

With regard to data access control, this may take the form of providing a generally secure environment in which the data to be secured is kept and then controlling use of data accessing equipment. However, in many cases it is not possible to guarantee the security of the environment and in such cases the data to be secured must either be held in a tamper-proof package or stored in encrypted form. The latter approach may not always be possible (a master encryption key must be stored in clear) and therefore much effort has been put into the design of tamper-proof packages which, for example, destroy internally-stored critical data if any attempt is made to open the package. Although tamper-proof packages are usually designed to hold at least small circuit boards, tamper-proof features have also been provided for some "smart card" chips.

Turning now to function usage control with which the present invention is concerned, various techniques are known for ensuring that only authorised persons can gain operational access to items such as computer systems and other electronic equipment. For example, a computer may offer password protection whereby upon power on of the computer or following activation of password protection (for example, when a user temporarily goes away from the computer), a predetermined password must be entered before the operational capabilities of the computer are restored. Another well-known function usage control technique is the use of personal identification numbers (PINs) in relation to automatic teller machines (ATMs). In both these cases, a user has to remember the enabling password (of whatever form, including a PIN) with the result that such passwords are usually short and not very secure, often being guessable.

An alternative approach is to use a portable element such as a magnetic-stripe card or a "smart" card to store an enabling password, this portable element being carried by an authorised user and being used to enable the equipment concerned. In this case, the password may be considerably longer and therefore more secure.

One potential weakness in the foregoing arrangements is that the equipment subject to usage control needs to store a copy of the enabling password for comparison against a user input password (returning us to the data access control issue). If the password is stored in clear, the password can be discovered if the equipment can be internally physically accessed by an unauthorised user (here referred to as an "intruder"). One way to overcome this weakness is to store only a signature of the password of the equipment, the signature being of such a form that the password cannot be derived from it whilst the equipment can readily form the signature from the password when the latter is input by a legitimate user. Such an approach uses a function such as a one-way hash function to derive the signature from the password.

However, even such sophisticated techniques can be rendered worthless if the physical structure of the equipment enables an intruder either to capture the password at the time of its input by a user (which may be possible even if the password is passed to the equipment in encrypted form), or to circumvent the usage control mechanism and directly access the functional elements of the equipment.

To overcome the possibility of an intruder gaining internal physical access to an item of equipment, it is known to provide physical locks on equipment cases. More sophisticated approaches are also known, though generally in the context of protecting highly sensitive data; thus, it is known to provide tamper-proof enclosures for encryption/decryption modules storing encryption/decryption keys, any attempt to open the module resulting in destruction of the keys. Such an approach to providing a defense against internal physical tampering, whilst effective, is generally very expensive and is not applied to the protection of functionality that is not intimately associated with sensitive data.

It is an object of the present invention to provide a general approach to function usage control which is suitable for electronic equipment that may be physically accessible to unauthorised users but which does not require the use of a special tamper-proof enclosure.

SUMMARY OF THE INVENTION

In general terms, the present invention envisages providing function usage control at the level of the integrated circuit devices making up an electronic assembly whereby the use of the functionality provided by at least one of the integrated circuit devices first requires that device to be provided with the correct password ("chip key") in encrypted form. Such function usage control is provided by a lock circuitry cell incorporated into each device requiring controlled access to its functionality. With such an arrangement, an intruder having internal physical access to an item of equipment cannot unlock the functionality of a protected device, and cannot access that functionality directly since opening up the device concerned would destroy the soughtafter functionality.

More formally stated, according to the present invention there is provided an integrated circuit device comprising a functional block for providing the device with a required functionality, and lock circuitry for inhibiting operation of this functional block until the provision to the lock circuitry, from externally of the device, of at least one predetermined chip key in encrypted form; the lock circuitry comprising:

storage means for storing at least one reference value, secure communication means for receiving an input from externally of the device and for subjecting that input to a decryption process to produce a first intermediate value, the nature of the decryption process being such that said first intermediate value corresponds to the clear form of a said chip key when said input is that key in encrypted form, means for receiving the first intermediate value and for performing a one-way function on it to produce a second intermediate value, comparison means for detecting a match between tie second intermediate value and a stored reference value, and for producing an enable signal when at least one such match has been detected, and inhibit means for inhibiting operation of said functional block until the enable signal is produced;

the primary purpose of said functional block being the control of an external item and/or the processing and output of externally supplied data.

By way of example, the secure communication means may implement the Diffie-Hellman Key Exchange algorithm with a one-time cryptographic key being used for passing said input to the device. The one-way function may be a one-way hash function such as effected by the Secure Hash Algorithm.

In the preferred embodiment of the invention, the inhibit means cuts off a required clock signal to the functional block thereby rendering the latter internally inoperative rather than merely operationally inaccessible.

In one embodiment of the invention, the storage means stores a plurality of reference values in respect of the said functional block, the comparison means producing said enable signal only after detecting a match for each stored reference value.

In another embodiment, the device is provided both with a plurality of functional blocks each having a respective reference value stored in the storage means, and with a respective inhibit means for each functional block; in this case, upon the comparison means detecting a match between the second intermediate value and a stored reference value, it provides the enable signal to the inhibit means of the functional block associated with the matched reference value.

With either of the foregoing embodiments, it is also possible to arrange for operational enablement of one functional block to be conditional upon both the receipt of an enable signal by the corresponding inhibit means and the prior enablement of another one of the functional blocks.

The present invention embraces the concept of having a family of integrated circuit devices all including a lock circuitry of the above form, the lock circuitry preferably being available as a standard cell for incorporation into new integrated circuit devices as required.

Thus, according to another aspect of the present invention, there is provided a standard cell for incorporation into an integrated circuit device to control operational enablement of a functional block of the device, the standard cell comprising:

storage means for storing at least one reference value, secure communication means for receiving an input and subjecting it to a decryption process to produce a first intermediate value, one-way means for receiving the first intermediate value and for performing a one-way function on it to produce a second intermediate value, and comparison means for detecting a match between the second intermediate value and a stored reference value, and for producing an enable signal when at least one match has been detected.

The standard cell may further comprise inhibit means for cutting off a required signal, such as a clock signal, to the functional block until said enable signal is produced; alternatively, the inhibit means may be designed into the circuitry of the functional block itself.

The present invention therefore envisages an integrated circuit manufacturing method including the steps of providing a library of fabrication data on a plurality of standard cells and selecting and utilising the fabrication dam on at least one such cell in the manufacture of an integrated circuit device, the library including fabrication data on a standard cell of the form set out in the preceding paragraph.

BRIEF DESCRIPTION OF THE DRAWINGS

An integrated circuit device embodying the invention and electronic assemblies incorporating such devices in accordance with the invention, will now be described, by way of non-limiting example, with reference to the accompanying diagrammatic drawings, in which:

FIG. 3($b$) is a diagram of a second arrangement of three integrated circuit devices provided with lock circuitry.

BEST MODE FOR CARRYING OUT THE INVENTION

Figure 1:
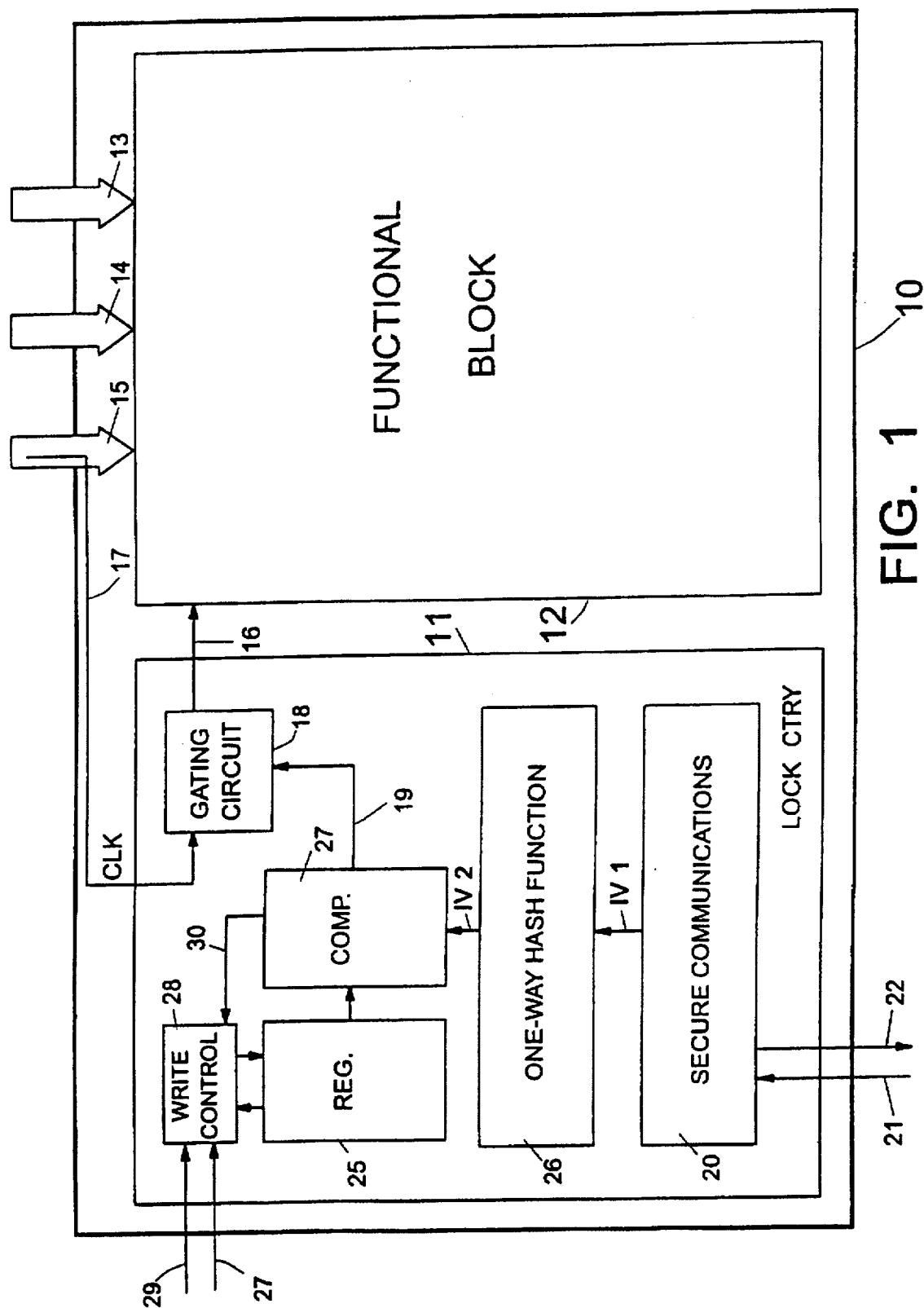
FIG. 1 is a block diagram of the integrated circuit device showing the lock circuitry for controlling enablement of a functional block of the device.

The integrated circuit device 10 (hereinafter "chip") shown in diagrammatic form in FIG. 1 comprises lock circuitry 11 controlling operational enablement of a functional block 12 (FIG. 1 is not intended to accurately represent the relative chip areas occupied by the circuitry 11 and functional block 12). Functional block 12 may, for example, be a data compression engine for compressing/ decompressing externally supplied data, or part of a disk-drive controller.

The functional block 12 is connected to external data, address and control lines 13, 14, 15 through external chip contacts (not explicitly shown). The block 12 operates in standard manner with the exception that for its operation it needs to be supplied with a signal on line 16 coming from the lock circuitry 11. In the present example, the required signal on line 16 is an external clock signal delivered over control line 17 to a gating circuit 18 of the lock circuitry 11. When the gating circuit is fed with an enable signal on line 19, the external clock signal is passed to the block 12 enabling its operation; in the absence of an enable signal on line 19, the block 12 is internally non-operational.

To unlock the lock circuitry 11 to enable block 12, a predetermined password (chip-key) must be supplied to the lock circuitry 11 from externally of the chip 10. Two particular measures are taken to ensure the confidentiality of this chip-key. First, the chip-key is passed to the chip 10 in encrypted form, the encrypted chip-key being decrypted in the lock circuitry 11. To this end, the lock circuitry comprises a secure communication block 20 that communicates with the outside world over serial input and output lines 21, 22. The block 20 implements, for example, the well-known Diffie-Hellman Key Exchange algorithm (see, for example, "Network and Internetwork Security", p.342, William Stallings, Prentice Hall International, 1995); by operating this public key algorithm with one-time cryptographic keys, a chip-key can be passed to the chip 20 in a confidential manner that is proof against a replay attack.

When the secure communications block 20 is fed with an encrypted chip-key, it decrypts the chip-key and temporarily outputs the chip-key as first intermediate value IV1.

The second measure taken to ensure the confidentiality of the chip-key, is that a copy of the chip-key is not stored as such in chip 10 for comparison against the input chip-key. Instead, a signature of the correct chip-key for the chip concerned is stored in register 25 of the lock circuitry, this signature being a value formed by subjecting the clear form of the chip-key to a one-way function. This one-way function is, for example, a one-way hash function such as effected the Secure Hash Algorithm SHA (see page 276 of the aforesaid reference "Network and Internetwork Security"). Were an intruder able gain access to register 25 in a manner permitting its contents to be read, this would not compromise the chip-key as it would not be computationally feasible to determine the latter from its signature held in register 25.

In order to ascertain whether an input chip-key is the correct one to unlock the particular chip 10 concerned, the lock circuitry further comprises a one-way function block 26 that subjects the chip-key output as IV1 from block 20 to the one-way function (in this case, the SHA) used to form the chip-key signature held in register 25.

The resultant intermediate value IV2 output by block 26 is then compared in comparison block 27 with the signature stored in register 25; if a match is found, the comparison block 27 outputs an enable signal on line 19 to cause operational enablement of the functional block 12. The comparison block latches the enable signal in the sense that once this signal is generated, it remains present notwithstanding removal of the correct IV2 value, until the chip is de-energised (or some other condition is achieved).

The chip-key signature stored in register 25 may be set in permanently at the time of manufacture or, as in the present example, written in subsequently (the register in this case being for example, Flash or EEPROM memory). To control this latter process, the chip 10 is provided with a write control circuit 28 interposed between the data lines 14 and the register 25. In order to write to the register 25, the required chip-key signature value is placed on the data lines 14 and a write-enable signal is passed on line 29 to the write control circuit 28. Additionally, the write control circuit 28 is arranged only to enable writing to the register 25 either if its contents are all zeroes (indicating that no chip-key signature has yet been written in) or if the lock circuitry is currently in its unlocked state (as indicated, for example, by the presence of a signal on line 30 from the comparison block 27).

Once the required chip-key signature has been written to the register 25, further writing to the register could be prevented by providing a fusible link in the write control circuitry 28, the link being blown upon application of an appropriate external signal on line 31.

Typically, the chip key in clear form may have a length of 1K bits.

Figure 2:
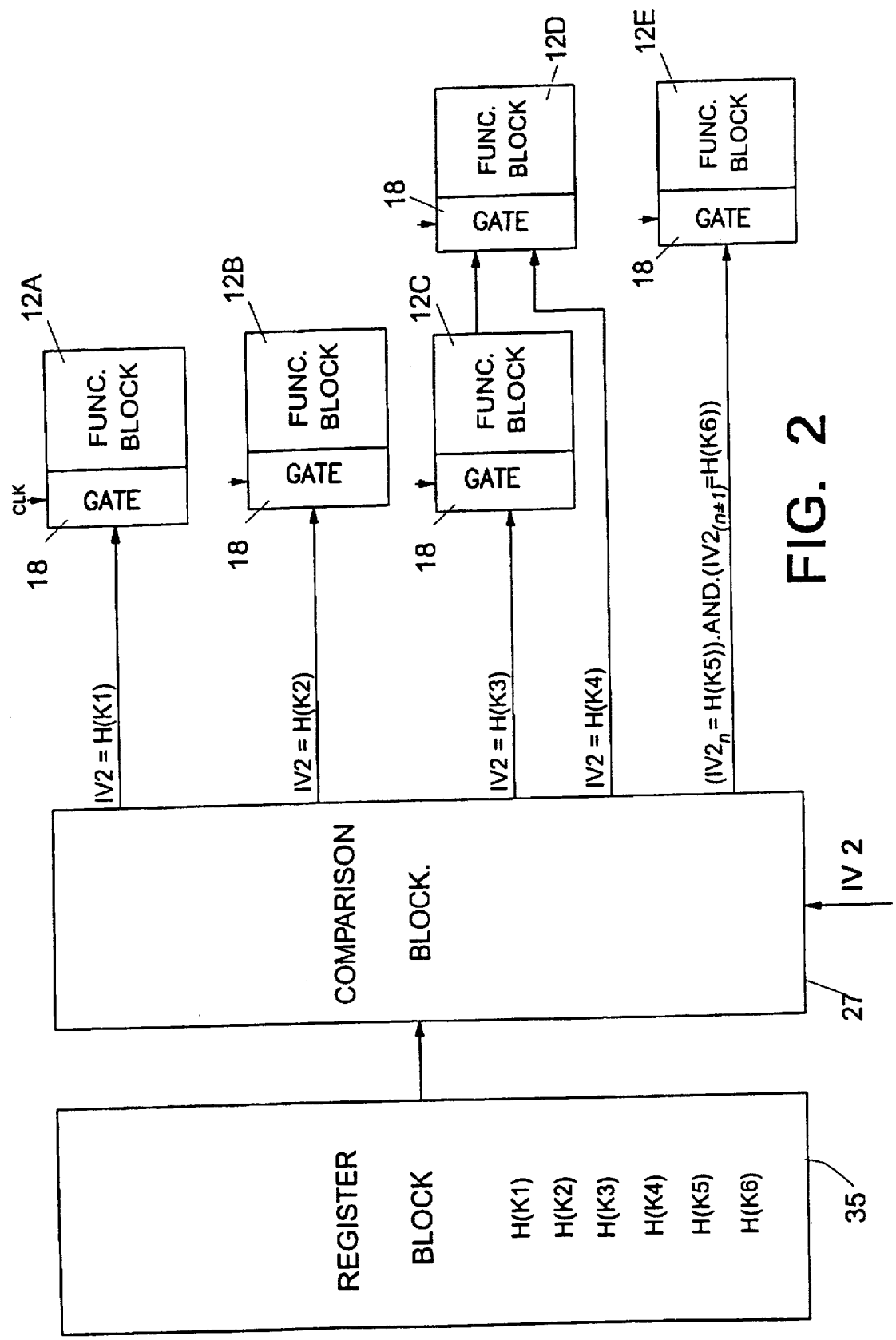
FIG. 2 is a diagram illustrating various arrangements for enabling different functional blocks provided in the same integrated circuit device.

Although in FIG. 1 the chip 10 is shown with only one functional block 12 controlled by the lock circuitry 11, a number of such blocks may be provided typically each with different functionality. Such an arrangement is shown in FIG. 2 for five functional blocks 12A to 12E. In this case a respective gating circuit 18 is associated with each functional block and the register 25 is replaced by a register block 35 storing signatures for a plurality of different chip-keys associated with particular ones of the functional blocks. In FIG. 2, these signatures are designated H(K1) to H(K6), corresponding to the hash of chip-keys K1 to K6 respectively. When presented with an intermediate value IV2, the comparison block 27 now searches for a match amongst the signatures H(K1) to H(K6) stored in register block 35 and upon finding a match takes appropriate action in respect of the associated functional block.

In the FIG. 2 example, for functional blocks 12A, 12B, 12C a single respective signature H(K1), H(K2), H(K3) is stored in register block 35 and upon signal IV2 taking on a corresponding value, the comparison block 27 outputs an enable signal to the appropriate functional block. The functionality of the blocks 12A, 12B and 12C can thus be selectively enabled according to the input chip-key and this permits different functionality to be made available to different users.

The enablement of block 12D is more involved than for blocks 12A,B,C. In this case, not only must signal IV2 take on the correct value corresponding to the stored signature H(K4) for block 12D, but block 12C must also have first been enabled. This is achieved by having the gating circuit 18 associated with the block 12D only enable the latter upon receipt of enable signals both from the comparison block 27 and from the block 12C, the latter only supplying such a signal when itself enabled. This general arrangement permits a hierarchical access scheme to be implemented by which each level has a corresponding chip-key and users can only enable functional blocks up to a level in the hierarchy for which they have the correct chip-keys.

Enablement of functional block 12E requires the input of two encrypted chip-keys K5, K6 (possibly in direct succession), the register block 35 storing the corresponding signatures H(K5), H(K6) of both chip-keys. In this case, the comparison block 27 when identifying a match for a first one of the chip-keys, must remember this fact and await detection of a match for the second one of the chip-keys before outputting an enable signal to the gating circuit 18 associated with functional block 12E.

It will be appreciated that the different approaches described above for enabling blocks 12A–C, block 12D, and block 12E can be used in any desired combination as required. It will also be appreciated that the chip 10 can be provided with one or more functional blocks that are not controlled by the lock circuitry 11, such blocks being unconditionally available for use.

FIG. 3 illustrates two arrangements of three chips 10 in an electronic assembly. For clarity, in FIG. 3, only the input connection to the lock circuitry 11 of each chip 10 has been shown, this connection being represented by a single line (generally, it will be two lines as shown in FIG. 1 as two-way communication is required for the secure communication process). Again, for clarity, each chip is shown as having only one main functional block 12 controlled by the lock circuitry 11.

Figure 3A:
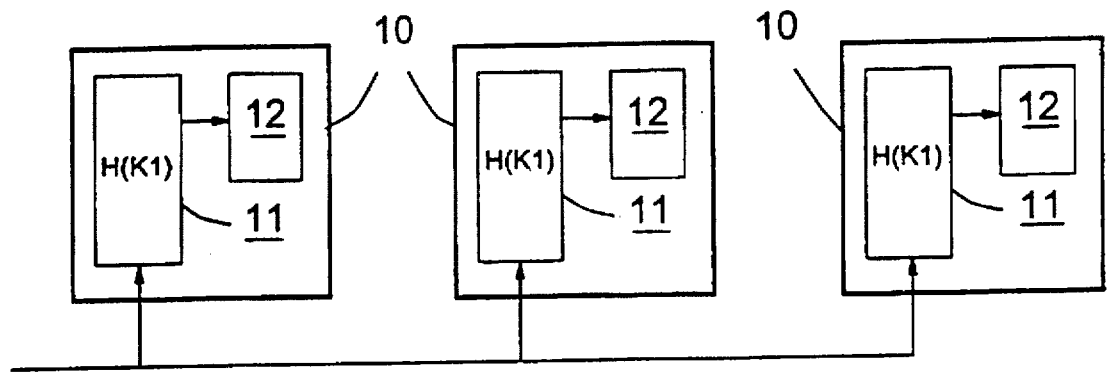
FIG. 3($a$) is a diagram of a first arrangement of three integrated circuit devices provided with lock circuitry.

FIG. 3(a) illustrates an arrangement in which all three chips 10 are fed with the encrypted chip key for unlocking their functionality, each chip storing the same chip key signature. This arrangement is suitable where the chips each contain critical functionality but an authorised user of such functionality needs access to all such functionality and there is no practical requirement for selective enablement of functionality of the electronic assembly.

Figure 3B:
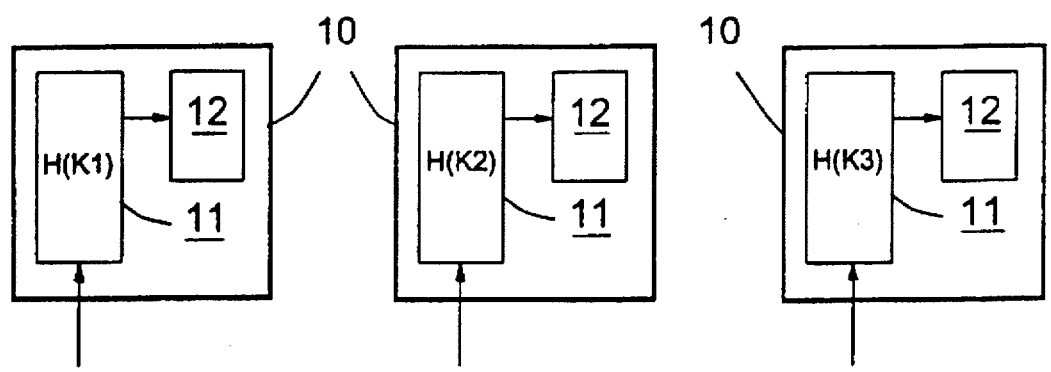

FIG. 3(b) illustrates an arrangement in which all three chips 10 are independently controlled for unlocking their functionality, each chip storing a different chip key signature. Such an arrangement is suitable where the functions provided by the chips can be used independently and different users are granted different usage permissions.

It will be appreciated that where different chip keys are to be passed to different chips, this can be done over the same communication lines since passing a chip key to a chip for which it is not intended simply means that the chip will not be unlocked.

Various modifications may be made to the described embodiments of the present invention. Furthermore, as will be apparent from the foregoing, lock circuitry 11 can be provided in chips having a variety of different functions. The lock circuitry can thus be considered as a building block useful for designing chips with secure functionality. To this end, fabrication data on the lock circuitry can be held in a standard cell library and then used as required in the design and manufacture of a family of chips all exhibiting the security features provided by the lock circuitry.

I claim:

1. An integrated circuit device comprising a functional block for providing the device with a required functionality, and lock circuitry for inhibiting operation of said functional block until the provision to the lock circuitry, from externally of the device, of at least one predetermined chip key in encrypted form; the lock circuitry comprising:

storage means for storing at least one reference value, secure communication means for receiving an input from externally of the device and for subjecting that input to a decryption process to produce a first intermediate value, the nature of said decryption process being such that said first intermediate value corresponds to the clear form of a said chip key when said input is that key in encrypted form, means for receiving said first intermediate value and for performing a one-way function on it to produce a second intermediate value, comparison means for detecting a match between said second intermediate value and a said at least one reference value, and for producing an enable signal when at least one said match has been detected, and inhibit means for inhibiting operation of said functional block until said enable signal is produced;

the primary purpose of said functional block is the control of an external item and/or the processing of externally-supplied data.

2. An integrated circuit device according to claim 1, wherein functional block is rendered internally inoperative by said inhibit means until said enable signal is produced.

3. An integrated circuit device according to claim 2, wherein said inhibit means is operative to cut off a required clock signal to the functional block until said enable signal is produced.

4. An electronic assembly, including a plurality of integrated circuit devices permanently installed therein, at least one said device being in accordance with claim 1.

5. A device according to claim 1, wherein said storage means stores a plurality of said reference values in respect of said functional block, said comparison means producing said enable signal only after detecting a said match for each reference value of said plurality of reference values.

6. A device according to claim 1, wherein the device is provided with a plurality of said functional blocks and said storage means stores a respective said reference value in respect of each such functional block, the lock circuitry comprising a respective said inhibit means for each functional block and the comparison means upon detecting a match between said second intermediate value and a said reference value, providing said enable signal to the inhibit means of the functional block associated with the matched reference value.

7. A device according to claim 6, wherein operational enablement of one said functional block is conditional upon both the receipt of an enable signal by the corresponding inhibit means and the prior enablement of another of said functional blocks.

8. A family of integrated circuit devices according to claim 1, wherein the functionality provided by the said functional block differs between said devices.

9. A standard cell for incorporation into an integrated circuit device to control operational enablement of a functional block of the device, the standard cell comprising:

storage means for storing at least one reference value, secure communication means for receiving an input and subjecting it to a decryption process to produce a first intermediate value, one-way means for receiving said first intermediate value and for performing a one-way function on it to produce a second intermediate value, and comparison means for detecting a match between said second intermediate value and a said at least one reference value, and for producing an enable signal when at least one said match has been detected.

10. A standard cell according to claim 9, further comprising inhibit means for cutting off a required clock signal to the functional block until said enable signal is produced.

11. An integrated circuit manufacturing method including the steps of providing a library of fabrication data on a plurality of standard cells and selecting and utilising said fabrication data on at least one such cell in the manufacture of an integrated circuit device, said library including fabrication data on a standard cell according to claim 9.

12. An integrated circuit manufacturing method including the steps of providing a library of fabrication data on a plurality of standard cells and selecting and utilising said fabrication data on at least one such cell in the manufacture of an integrated circuit device, said library including fabrication data on a standard cell according to claim 10.

* * * * *